United States Patent Office 3,432,412
Patented Mar. 11, 1969

3,432,412
PHOTOCHEMICAL PRODUCTION OF POLY-
(1,4-PHENYLENE ETHERS)
Hans-Dieter Becker, Schenectady, N.Y., assignor to
General Electric Company, a corporation of New
York
No Drawing. Filed May 3, 1966, Ser. No. 547,179
U.S. Cl. 204—158     10 Claims
Int. Cl. C07c 43/20, 41/00; B01j 1/10

This invention relates to the preparation of poly-(1,4-phenylene ether) by irradiating with light a solution of either 4-phenoxyphenol (p-phenoxyphenol) or 4-(4'-phenoxyphenoxy)phenol in the presence of a photosensitizer.

Polyphenylene ethers, as a class, form an interesting group of new polymers covered by the copending application of A. S. Hay, Ser. No. 212,128, filed July 20, 1962, and now U.S. Patent No. 3,306,875, as a continuation-in-part of previously filed applications and assigned to the same assignee as the present invention. These polymers were also first described in a publication by Hay and co-workers in J. Amer. Chem. Soc. 81, 6335 (1959) and in more detail in a later series of articles appearing in J. Polymer Science, 58, 581–609 (1962). These are poly-(1,4-phenylene ethers) and are made by an oxidative coupling reaction of various phenols in the presence of an amine basic cupric salt complex in which the hydrogen of the phenolic group and the hydrogen or halogen on the benzene ring are removed in forming the poly-(1,4-phenylene ethers). The most desirable poly-(1,4-phenylene ethers) are made from 2,6-di-substituted phenols. This is because they are linear polymers joined through the 1 and 4 position, with each unit of the polymer molecule being joined to the adjacent unit through the oxygen of the phenolic hydroxyl group. If the phenols are unsubstituted on either one or both of the 2 and 6 positions, then coupling can also occur at these positions in addition to the 4 position, thereby producing a branch-type of polymer or a cross-linking polymer rather than the linear polymer. Cross-linking and branching of the polymer can be greatly suppressed by using a cyclic amine having large bulky substituents on the carbon atoms adjacent to the amine nitrogen as part of the basic cupric salt complex. However, such amines are not readily available commercially except as high priced laboratory reagents.

I have now unexpectedly found that 4-phenoxyphenol, which is readily available as a commercial product, and salt of 4-phenoxyphenol, or mixtures of these two phe- pared from 4-phenoxyphenol by the Ullmann reaction from the methyl ester of p-bromophenol and the sodium salt of 4-phenoxyphenol, or mixtures of these two phenoxyphenols, can readily be polymerized when irradiated in the presence of a photosensitizer. It will be readily apparent that 4-phenoxyphenol is the dimeric oligomer and 4-(4'-phenoxyphenoxy)phenol is the trimeric oligomer of poly-(1,4-phenylene ether). In this photosensitized reaction, two molecules of either the dimer or trimer react with each other in a step-wise reaction in which one molecule of phenol and one molecule of the next higher oligomer are produced, i.e., two molecules of the dimer, 4-phenoxyphenol, would produce one molecule of phenol and one molecule of the trimer, 4-(4'-phenoxyphenoxy)phenol. In the next step, one molecule of the trimer and one molecule of the dimer react to again produce one molecule of phenol and one molecule of the tetramer. Alternatively, two molecules of the trimer can react to produce one molecule of the dimer and one molecule of the tetramer in the same way as when the trimer is the starting material. Both of these reactions continue until the poly-(1,4-phenylene ether) having an average of up to about 20 phenoxy units is obtained and the polymer precipitates from solution. Further irradiation does not seem to be capable of causing further polymerization. This may be due to the fact that this polymer precipitates and no solvent which is inert to the reaction, has yet been found.

The reaction involved is believed to be a free radical reaction whereby the photosensitizer absorbs the light and becomes activated. The activated photosensitizer then reacts with either the dimer or trimer or mixture thereof, if both have been initially used, to produce ketyl radicals and aryloxy radicals. The aryloxy radicals dimerize to quinone ketals which dissociate to phenoxy radicals and aryloxy radicals of the next higher oligomer of the starting dimer or trimer. The phenoxy radical reacts with the ketyl radical in an oxidation-reduction reaction to regenerate the photosensitizer and produce phenol. The ketyl radical also can react with the aryloxy radical of the next higher oligomer in the same manner as it does with the phenoxy radical. However, this is not a necessary step in the overall reaction since this radical can participate in producing the growing polymer chain, but does occur at the termination of the reaction to produce the polymer molecule. The regenerated photosensitizer on further irradiation reacts in a similar manner with this produced higher oligomer to again introduce another phenoxy radical into the growing polymer chain.

In order to suppress side reactions, the wavelengths of the radiation should be such that light is absorbed by the photosensitizer but not by either the growing polymer chain, the initial phenoxyphenol or the solvent. To meet this criteria, the wavelengths of the light should include the range of 300–500 m$\mu$, but not substantially below 300 m$\mu$. The growing oligomeric chain, 4-phenoxyphenol, 4-(4'-phenoxyphenyl)phenol and the poly-(1,4-phenylene ether) all absorb in the region of 280 m$\mu$ and below. The wavelengths of the light may include those greater than 500 m$\mu$, but preferably the greatest proportion of the wavelengths are in the cited range.

The solvents must be liquids capable of dissolving the starting phenoxyphenol, the growing oligomeric chain and the photosensitizer. Furthermore, they likewise must not absorb in the region of the wavelengths of light used. It would be highly desirable if a solvent could be found for the poly-(1,4-phenylene ether) product since the fact that it precipitates from the solution after about an average of 14 to 20 phenoxy units are joined together in a molecule, may account for the fact that higher molecular weight material cannot as yet be produced by this process. The solvent used must likewise be inert to both the reactants, the growing polymer chain, the final product and to the free radicals taking part in the reaction as well as to the irradiation itself. Solvents which I have found convenient to use are the liquid aromatic hydrocarbons, for example, benzene, toluene, xylene, mesitylene, isodurene, ethyl benzene, etc. Of these, benzene, toluene and xylene are desirable because of their low cost and ready availability, with benzene being preferred.

Since oxygen or oxygen-containing gases would react with the phenoxy radicals as well as the reactants, the reaction should be carried out in the substantial absence of oxygen. I have also determined that side reactions occur which are undesirable, if the irradiation is carried out while heating the solution. Therefore, the reaction is generally carried out in the substantial absence of applied heat, and even more preferably, by cooling the reaction mixture below ambient temperature, but not below the freezing point of the reaction mixture, i.e., the reaction mixture should be a liquid phase.

The photosensitizer should absorb at least some of the wavelengths of the light used, i.e., in the range of 300–500 m$\mu$. Compounds which I have found useful for my process and which absorb in this region are benzophenone, acetophenone, benzaldehyde, benzil, benzoin, biacetyl and 4,4'-bis(dimethylamino)benzophenone. Of these, benzophenone is preferred since it causes little if any side reactions and produces the least contaminated product. The other photosensitizers are effective for the reaction but do produce some by-products and some discoloration of the final product, which requires additional process steps in work-up of the final product. The amount of photosensitizer is not critical. Very small amounts are effective and large amounts up to equimolar amounts based on the amount of the phenoxyphenol can be used. Generally, I use from 1 to 30 mole percent based on the moles of the phenoxyphenol. Amounts less than about 1 mole percent increase the time required for the irradiation to a point where it is more desirable to use larger amounts. However, even amounts as low as 0.1 mole percent or less are effective for the reaction.

A convenient source of light to be used for irradiating the solution is obtained by using an ultraviolet light and passing it through a filter, for example, Pyrex glass, which will filter out all light of wavelengths below 300 m$\mu$. Alternatively, irradiation from any appropriate source may be used keeping in mind that the actual range of wavelengths used should include the wavelengths which are absorbed by the particular photosensitizer. The radiation source is preferably chosen to contain the greatest amount possible of the wavelengths which are absorbed by the photosensitizer, but not by the other components of the reaction mixture. This is because only the light absorbed by the photosensitizer is utilized in promoting the reaction. When using any of above photosensitizers, ultraviolet light from a mercury vapor quartz lamp filtered through Pyrex glass is very satisfactory for my process.

The progress of the photosensitized reaction is easily monitored by withdrawing a small sample and determining when the concentration of phenol becomes constant. This is conveniently done by gas chromatography. The irradiation may be continued for 24 hours with no adverse effect, although in general the reaction is completed in about 4 hours as shown by the amount of phenol in the reaction mixture becoming essentially constant at that time.

In order that those skilled in the art may understand my invention, the following examples are given by way of illustration but not by way of limitation. In all the examples, parts and percentages are by weight unless otherwise stated. Theoretical values for analysis and molecular weight are given in parentheses following the determined values.

GENERAL PROCEDURE

The general procedure utilized in the following examples was to prepare a solution of the particular phenoxyphenol and photosensitizer in benzene, purge the solution with argon then irradiate the solution cooled to 18° C. At the end of the irradiation period, any polymer which had precipitated from the solution was removed. Any polymer remaining in the solution was precipitated by pouring the benzene solution into methanol containing a few drops of concentrated hydrochloric acid.

The light source used was a 100 watt mercury vapor lamp, General Electric type H-400 A 4/T, from which the glass jacket had been removed, leaving only the quartz envelope. This was surrounded by a Pyrex tube assembled to allow water cooling. The lamp and Pyrex jacket was surrounded by a vessel to contain reaction mixture.

Example 1

Using the general procedure, a solution of 1.86 g. of 4-phenoxyphenol, 0.364 g. of benzophenone in 100 ml. of benzene was irradiated for 18 hours. A precipitate started forming after 3 hours of irradiation. At the end of the 18 hours, all of the precipitate was filtered from the solution, yielding 0.530 g. of a light tan colored polymer having a softening range of 200–220° C. This polymer was identified as a poly-(1,4-phenylene ether) having 14 repeating phenoxy groups in the molecule. The polymer was found to have a molecular weight measured in camphor of 1281 (1295) and an elemental analysis of C, 77.49 (78.11), H, 4.71 (4.55).

The benzene filtrate was evaporated to about 5 ml. and poured into 300 ml. of methanol acidified with several drops of concentrated aqueous HCl while stirring, yielding 0.3 g. of another fraction of polymer having a softening point of 120–140° C. The infrared spectra of these two fractions are essentially identical. The polymer which was recovered from the methanol was identified as poly-(1,4-phenylene ether) having 17 repeating phenoxy units. It had a molecular weight determined thermoelectrically in warm dioxane of 1540 (1570) and elemental analysis of C, 78.51 (78.13), H, 4.48 (4.51). The lower softening range but higher molecular weight of the polymer recovered from the methanol is suggestive that perhaps there was some branching in the polymer structure in this polymer compared to that which precipitated during irradiation from the benzene.

Similar results were obtained when acetophenone benzaldehyde, benzil, benzoin, biacetyl and tetramethyldiaminobenzophenone were used in place of the benzophenone. However, in all these cases, the reaction was much slower to produce a precipitate of the polymer and furthermore, the recovered polymer was not as light colored, indicating that perhaps, in these cases, some of the photosensitizer had reacted to some extent with the poly-(1,4-phenylene ether) to produce colored products.

Example 2

Using the general procedure, a solution of 2.78 g. of 4-(4'-phenoxyphenoxy)phenol, 0.364 g. of benzophenone and 100 ml. of benzene were irradiated for 24 hours. At the end of 1 hour the precipitate had started to form. There was obtained 0.7 g. of polymer which precipitated from this reaction mixture and 0.3 g. after precipitation with methanol. The infrared spectra of these two fractions were identical with that of Example 1.

Example 3

Using the general procedure of Example 1, a solution of 1.39 g. of 4-(4'-phenoxyphenoxy)phenol and 0.93 g. of 4-phenoxyphenol and 0.364 g. of benzophenone in 100 ml. of benzene were irradiated. The solution became cloudy in about 1½ hours with a definite evidence of white solid after 2 hours. At the end of the 24 hours, 0.20 g. of polymer had precipitated from the benzene and 0.37 g. was obtained after precipitation with methanol.

The poly-(1,4-phenylene ethers) produced by this method, when heated in air above the softening point and held, will finally become solid again. At this point they have formed tough, flexible films. The products of my invention, therefore, may be used for the making of such films either on a substrate from which they may be removed or to produce a protective coating for the substrate. To aid in forming uniform films, solvents which are capable of dissolving the polymers can be used. Polyphenyls, e.g., biphenyl and phenyl ethers, e.g., diphenyl oxide and their halogenated products are satisfactory solvents when hot. The polymers may also be esterified with either monobasic or dibasic acids, anhydrides or acyl halides to produce esters which are useful as plasticizers for the general class of polyphenylene ethers as more fully disclosed and claimed in Gowan application, Ser. No. 528,779, filed Feb. 21, 1966.

Other modifications of this invention and variations in the procedures may be applied without departing from the scope of this invention. These and other modifications of this invention will be readily discernible to those skilled in the art and may be employed within the scope of the invention. The invention is intended to include all such modifications and variations as may be embraced within the following claims.

What I claim as new and desire to secure by Letters Patent of the United States is:

1. The process of making poly-(1,4-phenylene ether) which comprises irradiating, in the substantial absence of oxygen and applied heat, with light having a wavelength in the range of 300–500 mμ, but not substantially below 300 mμ, a solution of (a) a phenoxyphenol selected from the group consisting of 4-phenoxyphenol and 4-(4'-phenoxyphenoxy)phenol and (b) a photosensitizer selected from the group consisting of benzophenone, acetophenone, benzaldehyde, benzil, benzoin, biacetyl and 4,4'-bis-(dimethylamino)-benzophenone and (c) in an inert, liquid, aromatic hydrocarbon solvent which is substantially transparent to the wavelength of the light used for irradiation.

2. The process of claim 1 wherein the phenoxyphenol is 4-phenoxyphenol.

3. The process of claim 1 wherein the phenoxyphenol is 4-(4'-phenoxyphenoxy)phenol.

4. The process of claim 1 wherein the photosensitizer is benzophenone.

5. The process of claim 1 wherein the solvent is selected from the group consisting of benzene, toluene and xylene.

6. The process of claim 1 wherein the solvent is benzene.

7. The process of claim 1 wherein the photosensitizer is benzophenone and the solvent is benzene.

8. The process of claim 1 wherein the phenoxyphenol is 4-phenoxyphenol, the photosensitizer is benzophenone and the solvent is benzene.

9. The process of claim 1 wherein the phenoxyphenol is 4-(4'-phenoxyphenoxy)phenol, the photosensitizer is benzophenone and the solvent is benzene.

10. The process of claim 1 wherein the phenoxyphenol is a mixture of 4-phenoxyphenol and 4-(4'-phenoxyphenoxy)phenol, the photosensitizer is benzophenone and the solvent is benzene.

References Cited

Hay et al.: Journal of American Chemical Society, vol. 81 (1959), p. 6335.

J. Polymer Science, vol. 58 (1962), pp. 581–609.

HOWARD S. WILLIAMS, *Primary Examiner.*